United States Patent [19]
Todd

[11] 3,814,377
[45] June 4, 1974

[54] PRESSURE COMPENSATING TRICKLE VALVE

[76] Inventor: Theodore J. Todd, 1039 E. Grand Blvd., Corona, Calif. 91720

[22] Filed: Feb. 28, 1973

[21] Appl. No.: 336,413

[52] U.S. Cl. .................. 251/145, 61/13, 137/517, 137/525, 138/46, 239/542
[51] Int. Cl. .................... B05b 1/32, E02b 13/02
[58] Field of Search ..... 137/513.5, 517, 525, 525.1, 137/525.3; 138/44, 45, 46; 251/120, 145; 239/533, 534, 542, 546, 568, 602; 61/12, 13

[56] References Cited
UNITED STATES PATENTS

| | | | |
|---|---|---|---|
| 2,829,674 | 4/1958 | Segelborst et al. ................ | 138/45 |
| 2,962,046 | 11/1960 | Bochan ............................ | 137/513.5 |
| 3,518,831 | 7/1970 | Tibbalas, Jr. et al. ........... | 239/542 X |
| 3,546,884 | 12/1970 | Timpe ............................. | 239/534 |
| 3,693,888 | 9/1972 | Rondas et al. ................... | 239/542 X |

Primary Examiner—Alan Cohan
Assistant Examiner—George L. Walton
Attorney, Agent, or Firm—Paul A. Weilein

[57] ABSTRACT

The inner end of a tube for releasing pressurized fluid from an intermittent supply is tapered to form an inclined valve seat with a longitudinal groove in the valve seat and a flexible elastomer valve tongue closes against the valve seat to convert the groove into a restricted flow passage and the tongue varies in flexure with changes in pressure of the supply fluid to cover various extents of the open side of the groove so that the length of the restricted passage and the consequent resistance to release of the pressurized fluid vary to compensate for changes in the supply pressure of the fluid.

16 Claims, 13 Drawing Figures

PATENTED JUN 4 1974 3,814,377

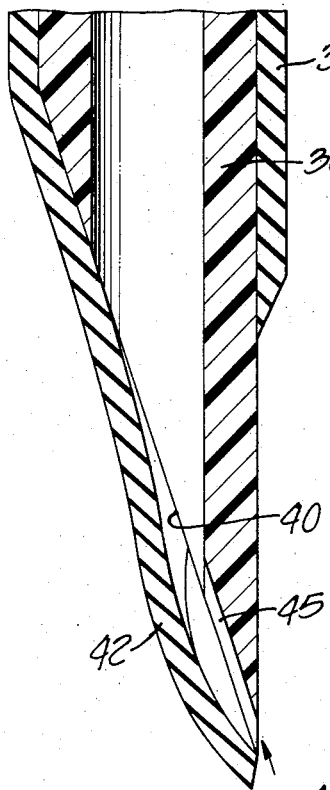
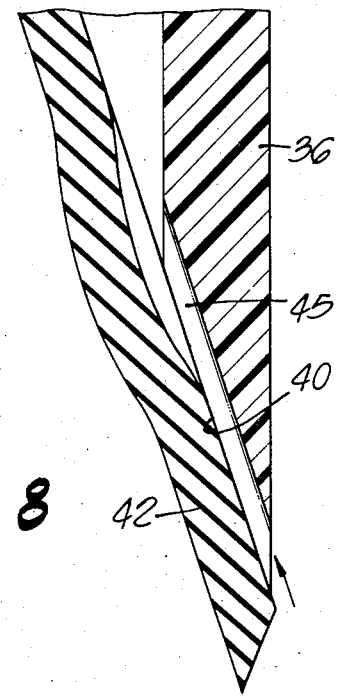
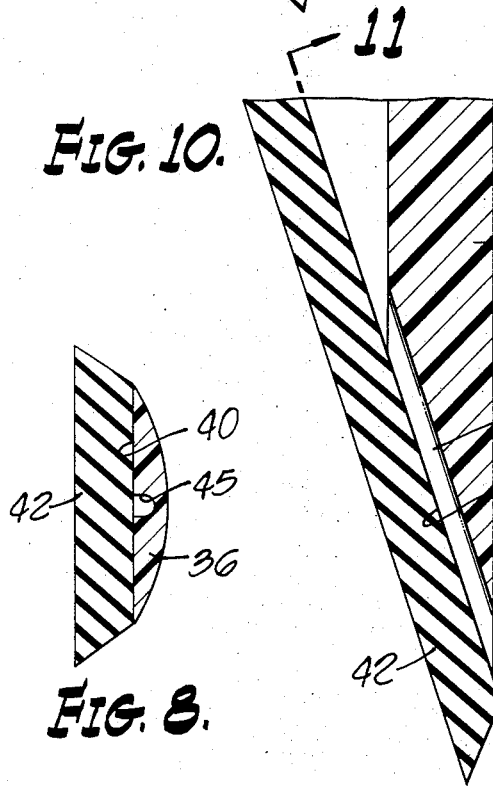
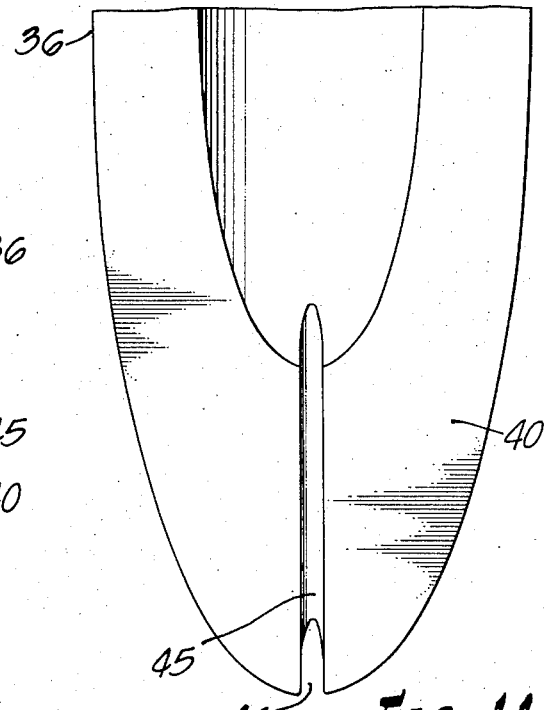
FIG. 6. FIG. 7. FIG. 9. FIG. 10. FIG. 8. FIG. 11.

PRESSURE COMPENSATING TRICKLE VALVE

BACKGROUND OF THE INVENTION

There are instances where release of fluid at a minute rate through a restricted passage from an intermittent pressurized source is required and where it is highly desirable to provide automatic periodic flushing action to avoid clogging of the restricted passage by particles of foreign matter. One such valve is a trickle emitter for subterranean irrigation of the character disclosed in my patent application Ser. No. 235,539, which disclosure is hereby incorporated into the present disclosure by reference.

In the above prior disclosure a valve cage extending upward from an intermittently pressurized subterranean irrigation line has an upper outlet valve seat with a notch in the valve seat to serve as a restricted bypass and initial fluid flow through the valve cage lifts a valve member in the form of a ball from a lower position in the cage to an upper position covering the upper valve seat where the ball limits the discharge flow to the notch in the valve seat. The upward travel of the ball provides an inherent delay that permits the initial flow of the pressurized fluid to flush out both the valve cage and the discharge passage therefrom before the rate of flow is reduced to the flow capacity of the notch in the valve seat.

A problem arises from the fact that the rate of flow from an emitter varies with the pressure of the fluid that is supplied to the emitter. Thus, if the pressure at the fluid source fluctuates, the rates of discharge of all of the emitters of the system fluctuate accordingly. In addition, with the source pressure at a given magnitude the pressure among the emitters may vary widely because of different lengths of flow paths to the different emitters and also because the different emitters may be at different levels relative to the level of the input end of the system. It is obviously undesirable to have the different emitters vary widely in their rates of discharge flow.

SUMMARY OF THE INVENTION

A primary object of the invention is to provide an emitter valve that inherently compensates for pressure variations and thus tends to release fluid at a desired given rate over a wide range of pressure supplied to the emitter. Broadly described this object is attained by limiting flow through the valve to a passage of restricted cross section and by causing the length of the restricted passage to vary directly with changes in the fluid pressure at the emitter valve. Thus, a rise in the fluid pressure causes corresponding increase in the length of the restricted passage with consequent increase in the resistance to flow through the passage to compensate at least in part for the pressure rise.

More specifically described, this object is attained by employing a restricted passage in the form of a relatively long groove and by employing a control member or valve member in the form of a flexible elastomer lip or tongue to close against the open side of the groove to limit flow through the valve to the flow capacity of the groove with the flexible valve tongue responsive to the supply pressure to cover an increasing extent of the groove in response to rise in the fluid pressure at the inlet of the emitter. By virtue of this arrangement the resistance to flow through the groove varies with the magnitude of the supply pressure at the emitter to tend to result in a given desired rate of fluid discharge over a relatively wide range of fluid pressures.

In the above referenced prior art emitter valve, the valve body must be upright because sole reliance is on gravity to bias the valve ball to open position. One object of the present invention is to provide an emitter valve which does not depend on gravity and therefore is operative at any position in relation to gravity. This object is attained by making the bias to open position of the flexible tongue inherent in the structure and mounting of the tongue. A feature of the invention, however, is that the tongue, if desired, may be positioned for its inherent bias to be augmented by gravity.

Another object of the invention is to provide a valve of the character described which inherently functions with a periodic flushing action to keep the minute flow passage from clogging. Such flushing action is inherent because in the absence of flow through the valve the resilient tongue is in open position. Initiation of fluid flow through the valve swings the flexible member from open to closed position but only after an initial delay to allow an initial surge of the pressurized fluid to flush out the valve.

Another object of the invention is to provide an emitter valve having a terminal flexible discharge hose, the outlet end of which may be buried in the soil with wide choice in the location of the buried end. This object is attained by employing a rigid tube for a flow passage in the valve with the rigid tube communicating with an external nipple to permit the end of a flexible hose to be telescoped onto the nipple.

A further object of the invention is to provide an emitter valve with the desired features that is of simple, inexpensive construction. In the preferred practice of the invention, the emitter valve is equipped with a rigid tube through which the pressurized fluid flows and the inlet end of the tube is simply tapered to provide a surface of the tube wall that is inclined at an acute angle relative to the axis of the tube and the required longitudinal groove is cut in this inclined surface. The resilient tongue is simply a tapered end portion of an elastomer tube that embraces the inlet end of the rigid tube.

The various features and advantages of the invention may be understood from the following detailed description and the accompanying drawings.

BRIEF DESCRIPTION OF THE DRAWINGS

In the drawings, which are to be regarded as merely illustrative:

FIG. 6 is a greatly enlarged and somewhat exaggerated sectional view showing the position of the flexible valve tongue when the supply pressure is exceedingly low, say 1 or 2 psi;

FIG. 7 is a sectional view similar to FIG. 6 showing the configuration of the elastomer valve tongue when the water pressure is at a somewhat higher magnitude, say 5 psi;

FIG. 8 is a transverse section along the line 8—8 of FIG. 7;

FIG. 9 is a sectional view similar to FIG. 7 showing the configuration of the flexible valve tongue when the supply water is at a substantial pressure, say 40 psi;

FIG. 10 is a sectional view similar to FIG. 9 when the supply pressure is increased to an even greater magnitude, say 60 psi;

FIG. 11 is a section along the line 11—11 of FIG. 10 showing the groove that is variably covered along its open side by the flexible valve tongue;

DESCRIPTION OF THE PREFERRED EMBODIMENT OF THE INVENTION

Figure 2:
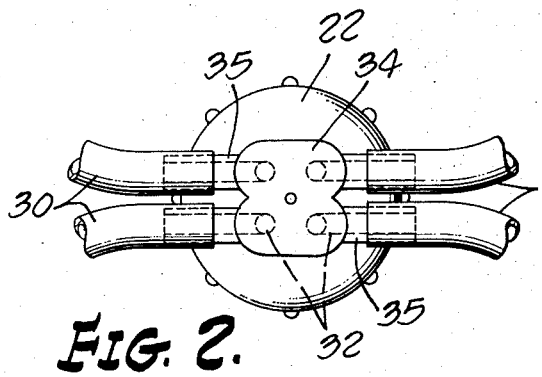
FIG. 2 is a plan view of the same embodiment.
Figure 1:
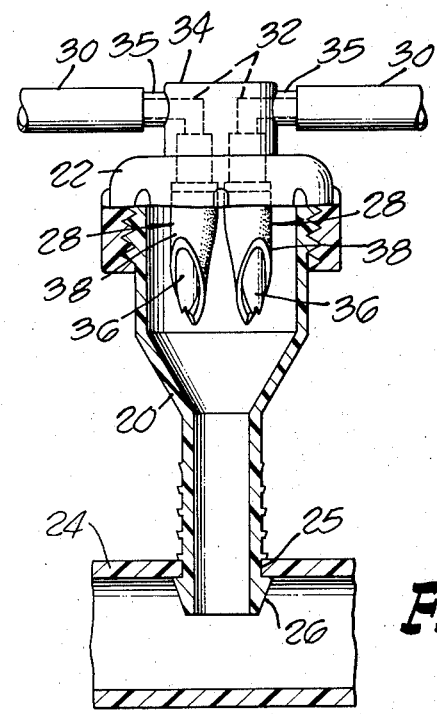
FIG. 1 is a sectional view, partly in side elevation, illustrating the presently preferred embodiment of the invention.

Referring to FIGS. 1 and 2, an emitter valve constructed in accord with the teachings of the present invention has a plastic body 20 that is closed by a screw threaded end cap 22 and is mounted on a plastic irrigation supply pipe 24. The lower end of the plastic body 20 is reduced in diameter and is shaped for mounting in a radial bore 25 of the plastic pipe 24, the reduced end of the body being formed with a tapered leading flange 26 to engage the inner wall of the pipe. It is a simple matter to forcibly insert the reduced end of the body 20 into the radial bore with suitable adhesive applied to seal the joint.

The removable cap 22 carries at least one emitter valve assembly that discharges into a corresponding external flexible hose 30, the outer end of which supplies water to plant life. In the construction shown there are four emitter valve assemblies 28 which communicate with four corresponding angular bores 32 in a projection 34 of the end cap 22, each of the four angular bores leading to an external nipple 35 onto which the end of a flexible hose 30 is telescoped.

Each of the emitter valve assemblies 28 comprises an inner rigid plastic conduit or tube 36 embraced by an outer tube or sleeve 38 of a flexible elastomer such as rubber. The inner or inlet end of the rigid tube 36 is cut at a taper to form an inclined flat valve seat 40 and the inner end of the outer tube or sleeve 38 is also cut at a taper to form a resilient tapered valve tongue or lip 42 that is shaped and dimensioned to flex to closed position against the valve seat 40.

As shown in FIG. 10, for example, the valve seat 40 formed by the tapered cut at the inner end of the rigid tube 36 is at an acute angle relative to the axis of the rigid tube, the angle preferably being substantially less than 45° as shown. FIG. 11 shows how the inclined valve seat 40 is provided with a longitudinal groove 45 which is of substantial length by virtue of the low angle of the surface and which forms a notch 46 at the leading edge of the surface.

Figures 3, 4:
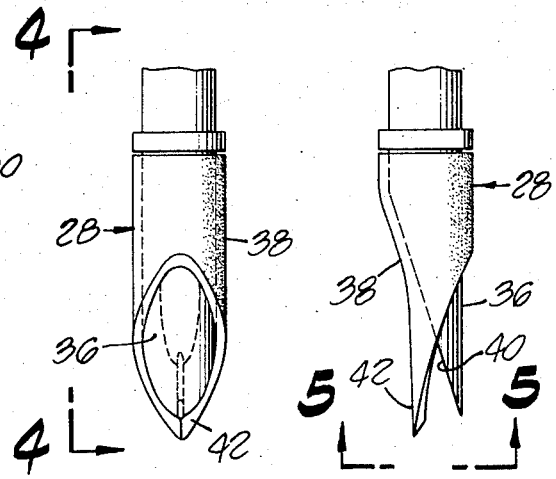
FIG. 3 is an enlarged fragmentary view of one of the emitter valves shown in FIG. 1.
FIG. 4 is a side elevation as seen along the line 4—4 of FIG. 3.
Figure 5:
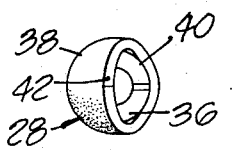
FIG. 5 is an end view as seen along the line 5—5 of FIG. 4.

Since the flexible valve tongue 42 is an end portion of a flexible tube the tongue is inherently biased to an open position spaced from the valve seat surface 40, as may be seen in FIG. 4. Preferably, the outer flexible tube 38 is slightly undersized relative to the outside diameter of the rigid tube 36 so that, as indicated in FIG. 5, the tapered end portion of the inner rigid tube 36 stretches the tapered tongue 42 to elliptical cross-sectional configuration as shown in FIG. 5 with consequent slight flattening of the tongue and slight arching of the tongue towards closed position.

The manner in which an emitter valve assembly 28 functions for its purpose may be readily understood from the foregoing description. In the absence of flow of water under pressure into the supply pipe 24 the flexible valve tongue 42 is at its maximum open position which may be the position indicated in FIG. 4 where it is apparent that there is a free channel for flow through the emitter valve assembly to the corresponding flexible hose 30. Thus, when the supply water is first turned on, an initial flow of water surges through the emitter valve assembly for effective flushing of the emitter valve assembly as well as the corresponding hose 30 that releases water to plant life.

The initial flow into the emitter valve assembly flexes the resilient tongue 42 towards the valve seat 40 because the high velocity flow into the rigid tube 36 lowers the pressure on the inner surface of the flexible tongue and the fact that the tongue is slightly inclined towards the valve seat 40 further promotes closing action by the flexible tongue. Once the flexible tongue starts to close the impingement of water flow against the outer surface of the tongue urges the tongue to closed position and when the tongue closes far enough for appreciable reduction of fluid flow into the rigid tube 36, the consequent rise in the pressure differential across the tongue greatly accelerates the closing movement of the tongue.

FIG. 6 shows the position of the flexible tongue 42 when it makes initial contact with the inclined valve seat 40 in which the longitudinal groove 45 is formed. It can be seen that the flexible tongue closes only the end of the longitudinal groove 45 to form with the longitudinal groove an exceedingly short restricted flow passage into the interior of the rigid tube 36. If the pressure in the supply pipe 24 is exceedingly low, say of a magnitude of 1 to 2 psi, the tongue remains at the position shown in FIG. 6. If the pressure increases, say to 5 psi, an increasing proportion of the length of the tongue closes against the longitudinal groove 45 to result in corresponding lengthening of the restricted flow passage through the groove into the interior of the rigid tube 36. Thus, the increased fluid pressure against the tongue lengthens the restricted passage formed by the longitudinal groove 45 and thereby increases the resistance to flow into the rigid tube 36 to compensate at least in substantial part for the rise in fluid pressure. FIG. 8 shows in cross section how the flexible valve tongue 42 closes the open side of the groove 45 to form the required restricted flow passage into the interior of the rigid tube 36.

When the supply pressure is on the order of 40 psi, for example, a greater proportion of the length of the flexible tongue 42 closes against the open side of the groove 45 as indicated in FIG. 9 and the consequent lengthening of the restricted flow passage increases the resistance to flow into the rigid tube 36 in compensation for the higher supply pressure. In like manner, as indicated in FIG. 10, raising the supply pressure even higher, say to 60 psi, results in increased flexure of the tongue 42 against the inclined valve seat 40 of the rigid tube to close the full length of the open side of the longitudinal groove 45 to increase the length of the restricted passage to maximum with consequent increase in resistance to flow into the rigid tube 36 in compensation for the higher pressure.

When a period of flow into the supply pipe 24 is terminated the inherent bias of the flexible tongue 42 causes the tongue to return to its normal position shown in FIG. 4. The immediate consequence is that the water left in the rigid tube 36 and in the angular bore 32 above the rigid tube drains back into the supply pipe 24 with consequent reverse flushing of the longitudinal groove 45.

Figure 12:
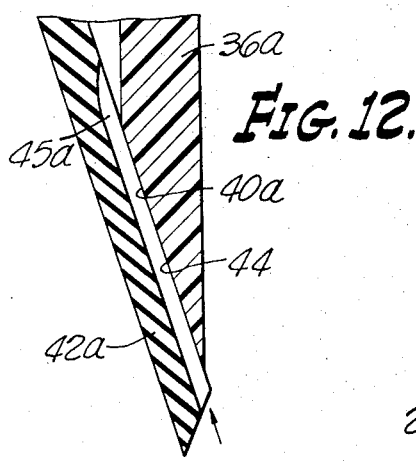
FIG. 12 is a sectional view similar to FIG. 10 showing how the longitudinal groove may be in the flexible valve tongue.

FIG. 12 is a sectional view similar to FIG. 10 wherein corresponding numerals indicate corresponding parts. In FIG. 12 the longitudinal groove 45a is on the inner face of the flexible tongue 42a instead of being formed in the inclined valve seat 40a of the rigid tube 36a. It is apparent that the structure in FIG. 12 has the same function and the same mode of operation as the structure illustrated by FIGS. 6-11.

Figure 13:
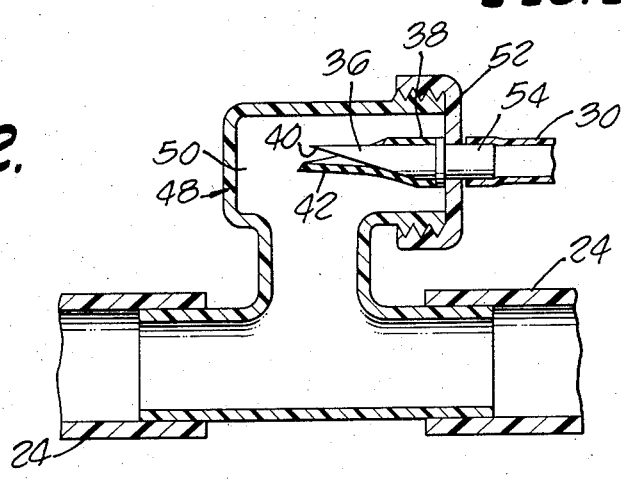
FIG. 13 is a sectional view illustrating another embodiment of the invention.

It is apparent from an inspection of FIG. 4 that gravity tends to maintain the pendant flexible tongue 42 in its normal position in the absence of fluid flow through the emitter valve assembly and thus gravity adds to the inherent bias of the flexible tongue. FIG. 13 shows an embodiment of the invention in which the force of gravity is even more effective in biasing the tongue 42 of an emitter valve assembly to open position.

In FIG. 13 a valve body, generally designated by numeral 48, is mounted between two lengths of a supply pipe 24 and the valve body forms a substantially horizontal cylindrical chamber 50 which is normally closed by a screw-threaded cover 52. The rigid tube 36 of a previously described emitter valve assembly is mounted horizontally in the cover 52 with a portion 54 of the rigid tube exposed at the exterior of the cover to serve as a nipple to receive the end of a corresponding flexible hose 30. In the usual manner the rigid tube 36 is embraced by a flexible elastomer tube or sleeve 38 which forms the usual flexible valve tongue 42 for cooperation with the valve seat 40 at the inner end of the rigid tube 36. It is apparent that in FIG. 13 where the flexible valve tongue 42 is on the lower side of the assembly, gravity highly favors the normal open position of the flexible tongue 42 and it is also apparent that water flowing upward into the valve body 48 from the supply pipe 24 impinges effectively on the outer surface of the flexible tongue to urge the flexible tongue towards its closed position.

My description in specific detail of the selected embodiments of the invention will suggest various changes, substitutions and other departures from the disclosure within the spirit and scope of the appended claims.

I claim:

1. The combination with a conduit that is intermittently supplied at its inlet end with pressurized fluid for periods of fluid flow therethrough, of means to restrict the flow through the conduit during the periods of flow, said restricting means comprising:

relatively rigid means forming an elongate groove of restricted cross section and constituting a portion of the passage formed by the conduit; and control means having one end supported on said rigid means and an elongate portion extending axially of the groove and across the interior of the conduit to restrict flow through the conduit to flow through the groove with consequent creation of pressure drop across the control means, said control means portion being positioned to close the open side of the groove thereby to form the groove into a restricted passage to restrict flow through the conduit, said control means portion being resiliently flexible to respond to said pressure drop to close an increasing longitudinal portion of the open side of the groove in response to increase in said pressure drop thereby to lengthen said restricted passage for increased flow resistance therethrough to compensate at least in part for the increased pressure drop.

2. A combination as set forth in claim 1 in which said control means portion is biased away from the open side of the groove to seek an open position spaced from the open side of the groove in the absence of pressurized fluid at the inlet to the conduit whereby initiation of supply of pressurized fluid at the inlet end of the conduit causes an initial surge of flow through the conduit to flush out the groove and the conduit.

3. A combination as set forth in claim 2 in which the conduit is substantially upright with its inlet end at its lower end and said control means portion is positioned to be biased by gravity to seek said open position in the absence of pressurized fluid at the inlet end of the conduit whereby interruption of supply of pressurized fluid at said inlet end to terminate a period of flow through the conduit results in the control means seeking its open position to permit drainage of the conduit by reverse flow to flush out the conduit.

4. A combination as set forth in claim 2 in which the conduit is substantially horizontal and said control means portion is positioned on the lower side of the conduit to be biased by gravity to seek an open position spaced from said groove.

5. A combination as set forth in claim 1 in which said conduit is mounted in a removable portion of the wall of the supply line.

6. A combination as set forth in claim 5 in which said conduit extends downward into a chamber that communicates with said supply line.

7. A combination as set forth in claim 1 in which the inlet end of said conduit communicates with a supply line of a subterranean irrigation system and the outlet end of the conduit communicates with a subterranean zone to water the roots of plant life, and a flexible hose connected to said conduit and having its outer end buried in the soil.

8. A combination as set forth in claim 1 in which said conduit is a tube of rigid material with a portion of the end wall at the inlet end of the tube tapered from the inner circumference of the tube to the outer circumference of the tube to provide an inclined surface at an acute angle to the axis of the tube and in which said groove is in the inclined surface and extends generally longitudinally of the tube.

9. A combination as set forth in claim 8 in which the inclined surface is at an angle relative to the axis of the tube that is substantially under 45°.

10. A combination as set forth in claim 9 in which the conduit is substantially horizontal and said inclined surface is on the upper wall of the conduit and said control means portion is biased by gravity to seek an open position spaced from the groove in the absence of pressurized fluid at the inlet end of the conduit.

11. A combination as set forth in claim 1 in which said conduit is a rigid tube and said groove is in the edge of the wall of the rigid tube at the inlet end of the rigid tube.

12. A combination as set forth in claim 11 in which said control means portion is a tapered end of a flexible elastomer sleeve telescoped over the inlet end of the rigid tube.

13. A combination as set forth in claim 12 in which the flexible elastomer sleeve is slightly undersized relative to the outside diameter of the rigid tube to cause the tapered inlet end of the rigid tube to slightly flatten the tapered end portion of the elastomer sleeve.

14. The combination with a conduit that is intermittently supplied at its inlet end with pressurized fluid for periods of fluid flow therethrough, of means to restrict the flow through the conduit during the periods of flow, said restricting means comprising:

a valve seat in the conduit and extending generally longitudinally of the conduit; and a resiliently flexible tongue with its free end extending longitudinally of the valve seat, the tongue and valve seat having respective surfaces that confront each other, the tongue being biased away from the valve seat, the tongue being positioned for impingement on its outer surface of the stream of pressurized fluid supplied to the conduit to cause the tongue to be flexed by said impingement against the valve seat in opposition to the bias of the tongue to cause mutual contact between the two confronting surfaces with longitudinal extent of the mutual contact varying with the pressure differential across the tongue, one of said confronting surfaces being formed with a longitudinal groove so that the open side of the groove is closed by mutual contact between the confronting surfaces thereby to form a restricted passage for fluid flow through the conduit with the length of the restricted passage varying with the pressure differential across the tongue.

15. A combination as set forth in claim 14 in which the longitudinal groove is formed in the confronting surface of the valve seat.

16. A combination as set forth in claim 14 in which the longitudinal groove is formed in the confronting surface of the flexible tongue.

* * * * *